US008277119B2

(12) United States Patent
Cloutier et al.

(10) Patent No.: US 8,277,119 B2
(45) Date of Patent: Oct. 2, 2012

(54) FIBER OPTIC TEMPERATURE SENSOR

(75) Inventors: Mathieu Cloutier, Richelieu (CA); Jean Pronovost, St-Mathieu de Beloeil (CA); Marius Cloutier, Longueuil (CA)

(73) Assignee: VibroSystM, Inc., Quebec (CA)

( * ) Notice: Subject to any disclaimer, the term of this patent is extended or adjusted under 35 U.S.C. 154(b) by 224 days.

(21) Appl. No.: 11/978,538

(22) Filed: Oct. 29, 2007

(65) Prior Publication Data

US 2008/0144698 A1   Jun. 19, 2008

Related U.S. Application Data

(60) Provisional application No. 60/875,719, filed on Dec. 19, 2006.

(51) Int. Cl.
  *G01K 11/20* (2006.01)
  *G01J 5/38* (2006.01)
(52) U.S. Cl. ............... 374/161; 374/131; 374/1; 356/43
(58) Field of Classification Search .................. 374/120, 374/121, 124, 129, 130, 131, 132, 141, 161, 374/1–2, 137, 187, 191; 356/43
  See application file for complete search history.

(56) References Cited

U.S. PATENT DOCUMENTS

| | | | |
|---|---|---|---|
| 3,213,197 A | 10/1965 | Hawkins | |
| 3,224,279 A | 12/1965 | Galli et al. | |
| 3,449,587 A | 6/1969 | Barnes | |
| 3,576,129 A * | 4/1971 | Crites | 374/161 |
| 3,666,949 A | 5/1972 | DeFalco et al. | |
| 3,789,674 A | 2/1974 | Anderson et al. | |
| 3,797,940 A | 3/1974 | King | |
| 3,942,866 A | 3/1976 | Roman | |
| 3,960,017 A | 6/1976 | Romanowski | |
| 3,961,185 A | 6/1976 | Brokenshire et al. | |
| 4,083,254 A | 4/1978 | Nissl | |
| 4,136,566 A * | 1/1979 | Christensen | 374/161 |
| 4,201,446 A * | 5/1980 | Geddes et al. | 385/125 |
| 4,226,120 A | 10/1980 | Nissl | |
| 4,239,963 A | 12/1980 | August et al. | |
| 4,313,344 A * | 2/1982 | Brogardh et al. | 374/126 |
| 4,322,829 A | 3/1982 | Davis, Jr. et al. | |
| 4,414,471 A | 11/1983 | Rines | |

(Continued)

FOREIGN PATENT DOCUMENTS

CN    1548932 A    11/2004

(Continued)

OTHER PUBLICATIONS

J. Kalenik, et al., "A cantilever optical-fiber accelerometer," *Sensors and Acutators A 68*, pp. 350-355, 1998.

*Primary Examiner* — Gail Verbitsky
(74) *Attorney, Agent, or Firm* — Muirhead and Saturnelli, LLC

(57) ABSTRACT

A temperature sensor, capable of operating in electromagnetic and/or electric environments such as electrical generators, motors and transformers and/or in environments where vibratory conditions are frequent or continuous, contains at least one light emitting optic fiber and one light receiving optic fiber and an electrically non-conductive dilatable object which variably occults the emitted light as the object's temperature varies. The light receiving optic fiber transmits light intensity and light intensity changes to an electronic device that may include a photometer and light-to-temperature computing equipment.

31 Claims, 13 Drawing Sheets

U.S. PATENT DOCUMENTS

| | | | |
|---|---|---|---|
| 4,437,772 A * | 3/1984 | Samulski | 374/129 |
| RE31,832 E * | 2/1985 | Samulski | 374/131 |
| 4,560,286 A * | 12/1985 | Wickersheim | 374/131 |
| 4,567,771 A | 2/1986 | Nelson et al. | |
| 4,592,664 A * | 6/1986 | Bijlenga et al. | 374/131 |
| 4,598,996 A * | 7/1986 | Taniuchi | 356/43 |
| 4,671,651 A * | 6/1987 | Toyoda et al. | 356/44 |
| 4,703,175 A * | 10/1987 | Salour et al. | 356/45 |
| 4,708,494 A * | 11/1987 | Kleinerman | 374/161 |
| 4,749,856 A * | 6/1988 | Walker et al. | 250/227.11 |
| 4,756,627 A * | 7/1988 | Nelson | 374/159 |
| 4,785,174 A * | 11/1988 | Hodges et al. | 250/338.1 |
| 4,800,267 A | 1/1989 | Freal et al. | |
| 4,846,546 A | 7/1989 | Cuda | |
| 4,859,079 A * | 8/1989 | Wickersheim et al. | 374/131 |
| 4,900,918 A | 2/1990 | Killian | |
| 4,906,107 A * | 3/1990 | Luukkala | 374/161 |
| 4,930,862 A | 6/1990 | Miers et al. | |
| 4,948,255 A | 8/1990 | Watanabe | |
| 4,950,885 A | 8/1990 | Kershaw | |
| 5,031,987 A | 7/1991 | Norling | |
| 5,052,820 A * | 10/1991 | McGinniss et al. | 374/131 |
| 5,103,106 A | 4/1992 | Golberstein | |
| 5,116,317 A | 5/1992 | Carson et al. | |
| 5,182,612 A | 1/1993 | Rhême | |
| 5,202,939 A | 4/1993 | Belleville et al. | |
| 5,271,675 A * | 12/1993 | Fagan et al. | 374/110 |
| 5,276,322 A | 1/1994 | Carome | |
| 5,295,206 A | 3/1994 | Mishenko | |
| 5,348,396 A * | 9/1994 | O'Rourke et al. | 374/161 |
| 5,351,268 A * | 9/1994 | Jensen et al. | 374/131 |
| 5,359,445 A | 10/1994 | Robertson | |
| 5,383,207 A * | 1/1995 | Culverhouse et al. | 372/28 |
| 5,385,404 A * | 1/1995 | Jones | 374/161 |
| 5,392,117 A | 2/1995 | Belleville et al. | |
| 5,437,186 A | 8/1995 | Tschulena | |
| 5,473,428 A * | 12/1995 | Lee et al. | 356/480 |
| 5,475,489 A | 12/1995 | Göttsche | |
| 5,557,099 A | 9/1996 | Zielinski et al. | |
| 5,705,809 A | 1/1998 | Kershaw | |
| 5,721,615 A * | 2/1998 | McBride et al. | 356/477 |
| 5,730,528 A * | 3/1998 | Allison et al. | 374/161 |
| 5,812,266 A | 9/1998 | Hercher | |
| 5,820,265 A * | 10/1998 | Kleinerman | 374/137 |
| 5,835,649 A | 11/1998 | Turner et al. | |
| 5,837,998 A | 11/1998 | Dinev et al. | |
| 5,870,511 A | 2/1999 | Sawatari et al. | |
| 5,886,265 A | 3/1999 | Chatrefou | |
| 5,939,632 A | 8/1999 | Moore et al. | |
| 5,986,272 A * | 11/1999 | Britton et al. | 250/459.1 |
| 6,008,898 A | 12/1999 | Furstenau et al. | |
| 6,031,946 A | 2/2000 | Bergmann et al. | |
| 6,045,259 A * | 4/2000 | Djeu | 374/161 |
| 6,137,573 A * | 10/2000 | Luke et al. | 356/453 |
| 6,204,499 B1 | 3/2001 | Schaefer | |
| 6,243,506 B1 | 6/2001 | Wu et al. | |
| 6,283,632 B1 * | 9/2001 | Takaki | 374/161 |
| 6,406,179 B2 * | 6/2002 | Adams et al. | 374/131 |
| 6,453,746 B1 | 9/2002 | Polosky et al. | |
| 6,494,095 B1 | 12/2002 | Wan | |
| 6,511,222 B1 * | 1/2003 | Bouamra | 374/161 |
| 6,568,268 B1 | 5/2003 | Bennett | |
| 6,649,905 B2 | 11/2003 | Grenlund | |
| 6,726,360 B2 * | 4/2004 | Singh et al. | 374/130 |
| 6,741,335 B2 | 5/2004 | Kinrot | |
| 6,886,404 B2 | 5/2005 | Digonnet et al. | |
| 6,921,894 B2 | 7/2005 | Swierkowski | |
| 6,932,809 B2 * | 8/2005 | Sinofsky | 606/12 |
| 6,960,019 B2 | 11/2005 | Dammann | |
| 7,308,163 B2 * | 12/2007 | Bratkovski et al. | 385/12 |
| 7,628,531 B2 * | 12/2009 | Lee et al. | 374/1 |
| 8,157,441 B2 * | 4/2012 | Kinugasa et al. | 374/161 |
| 2002/0134925 A1 | 9/2002 | Grenlund | |
| 2003/0086072 A1 | 5/2003 | Fukumoto et al. | |
| 2003/0231694 A1 * | 12/2003 | Ohsawa | 374/129 |
| 2005/0129088 A1 * | 6/2005 | Rajendran et al. | 374/161 |
| 2006/0077394 A1 * | 4/2006 | Suzuki et al. | 356/479 |
| 2007/0171402 A1 * | 7/2007 | Watley et al. | 356/73.1 |
| 2010/0272608 A1 * | 10/2010 | Penterman et al. | 422/69 |

FOREIGN PATENT DOCUMENTS

| | | |
|---|---|---|
| EP | 0 214 040 A2 | 3/1987 |
| EP | 0251048 A1 | 1/1988 |
| EP | 0 214 040 B1 | 2/1994 |
| EP | 0791812 A1 | 8/1997 |
| GB | 2152659 | 8/1985 |
| JP | 58-41333 | 3/1983 |
| JP | S61-34441 | 3/1986 |
| JP | S61-72654 | 5/1986 |
| JP | S62-98218 | 5/1987 |
| JP | S63-502531 | 9/1988 |
| JP | 02019730 A * | 1/1990 |
| JP | 03156332 | 7/1991 |
| JP | H3-156332 | 7/1991 |
| JP | 2006-71549 | 3/2006 |
| JP | 2006071549 | 3/2006 |
| SU | 45382 A1 | 12/1935 |
| WO | WO 9631762 A1 * | 10/1996 |
| WO | WO 2007/051831 A1 | 5/2007 |

* cited by examiner

FIBER OPTIC TEMPERATURE SENSOR

CROSS-REFERENCE TO RELATED APPLICATIONS

This application claims priority to U.S. Provisional Patent App. No. 60/875,719 filed on Dec. 19, 2006, which is hereby incorporated by reference.

TECHNICAL FIELD

This application relates to the field of temperature sensing and, more particularly, to a method and apparatus for temperature sensing using a fiber optic temperature sensor, for example, in electromagnetic and/or electric environments and industrial machines.

BACKGROUND OF THE INVENTION

Temperature measurement and monitoring in electric machines (for example, generators, motors, transforms and the like) often necessitate special precautions due to the presence of electromagnetic fields and/or mechanical vibrations. In particular, the presence of metallic or conductive parts in the part of the temperature sensing head which is inside or near those machines should be avoided, especially when monitoring the temperature of stator bars of generators and/or motors or the temperature of the transformer coils. Also, metallic or conductive components can create partial discharge by changing the path of the electrical field.

In addition, temperature monitoring in such electromagnetic environments necessitates sensors that are reliable over a long period of time to avoid any kind of false alarms that can be costly. Further, these temperature sensors should be rugged and vibration-proof since such sensors are often expected to operate under vibratory conditions.

For such applications, temperature to be measured are generally less than 200° C. Since numerous sensors often may have to be located in various parts of a machine, monitoring costs, such as installation, measurement, maintenance and repair costs should be minimized and such sensors should be as small and as minimally intrusive as possible.

Temperature sensors that make use of fiber optics may transform temperature variations into light variations that can then be analyzed by photoelectric and/or electronic means far from the sensor head and from the electromagnetic environment. Examples of known temperature sensors incorporating fiber optics are described below.

U.S. Pat. No. 5,031,987 to Norling, which is incorporated herein by reference, describes an optical transducer facing the angled end of a single light emitting and receiving optical fiber so that any movement of the transducer (due to a temperature or pressure change) modifies the light reflected back into the optical fiber. To reduce the sensitivity of the system to shock and vibration, Norling discloses the use of a magnetically latched bimetallic thermal strip as a sensor element and a magnet that engages one end of the sensor element. In operation, the bimetallic strip, as a function of temperature, responds to magnetic attraction forces caused by the magnet.

U.S. Pat. No. 5,295,206 to Mishenko, which is incorporated herein by reference, describes a temperature sensor for the human body where a small air gap is increased or decreased by the relative dilation or retraction of a temperature sensitive rod fitted inside a metallic cylinder having a different temperature expansion coefficient. A reflective surface at one end of the rod reflects incoming light emitted through an optical fiber toward a parallel, and closely positioned, light receiving optical fiber. Change of received reflected light represents the change in temperature. However, little detail is supplied on the precise way in which the reflected light reaches the receiving optical fiber. Specifically, in optical fiber sensors, a non-negligible amount of reflected light may travel all around the air volume separating the emitting and the receiving fibers and may cause a lot of "noise", thus affecting the temperature change sensitivity and reproducibility of the temperature measurements. Moreover, movement of the optical fibers may cause non-reproducibility of measurements. In addition, minimum lateral friction of the rod over a long time period and under any temperature and vibration conditions must be assured, which would require great mechanical precision and fine adjustment costs.

U.S. Pat. No. 5,870,511 to Sawatari et al., which is incorporated herein by reference, uses a similar variable air gap principle as U.S. Pat. No. 5,295,206 to Mishenko. In Sawatari, a sensor head has a sensor housing coupled to the end of one optical fiber. A metallic reflective surface is coupled to the housing adjacent to the end of the optical fiber to form a gap having a predetermined length between the reflective surface and the optical fiber. A detection system is also coupled to the optical fiber which determines the temperature at the sensor head from an interference pattern of light which is reflected from the reflective surface. In addition to the issues discussed herein with respect to the device disclosed in the Mishenko reference, substantial costs for the analysis of the interference patterns in Sawatari must be taken into account.

U.S. Pat. No. 5,359,445 to Robertson, which is incorporated herein by reference, describes a temperature sensor with a cylindrical housing that dilates or retracts radially in connection with external temperature changes. The housing contains two opposing optical fibers separated by a transparent, flexible and patterned film that is sealed to the housing and which deforms with the housing's movement. This sensor could be used to measure the temperature of the gas or fluid in which the sensor is immerged but does not appear to lend itself to the measurement of the temperature of a solid since its cylindrical housing's movement and the film's pattern deformation could be hindered or at least biased by the friction of its cylindrical base against the solid. Also, no provision is made against the effects of vibrations having a radial component.

Other patents (for example, U.S. Pat. No. 6,960,019 to Dammann and U.S. Pat. Nos. 5,392,117 and 5,202,939, both to Belleville, et al., all of which are incorporated herein by reference) disclose the analysis of light interference patterns and Fabry-Pérot interferometry to propose small fiber optic temperature sensors. Such sensors, however, are generally required to be used in conjunction with complex, delicate and costly interference analysis equipment.

Accordingly, it would be desirable to provide a small and rugged fiber optic temperature sensor that may be effectively used in electromagnetic and/or vibratory environments to measure the temperature of a given part of a machine or apparatus and which does not require complex and costly equipment to analyze the information coming from the sensor.

SUMMARY OF THE INVENTION

According to the system described herein, a temperature sensor includes a conveyor that emits light and a first receiver disposed to receive light emitted from the conveyor. A temperature sensitive element is disposed in a light path between the conveyor and the first receiver that variably occults at least a portion of the light emitted by the conveyor, wherein the portion of light variably occulted by the temperature sensitive element varies according to a temperature change of the temperature sensitive element. The conveyor and the receiver may be optical fibers. The temperature sensitive element may be electrically non-conductive. A first detector may be coupled to the first receiver that analyzes light intensity of the light received by the first receiver and determines the change in temperature of the temperature sensitive element based on a change in the light intensity. A second receiver may be disposed alongside the first receiver, and the second receiver may receive a non-occulted portion of light from the conveyor, wherein the non-occulted portion of light received by the second receiver is substantially independent of the change in temperature of the temperature sensitive element. A second detector may be coupled to the second receiver that is used to calibrate the sensor. The second detector may allow calibration of the sensor resulting from a drift caused by at least one of: aging of the sensor, ambient temperature variations, and light conductivity change of the conveyor or first receiver. An electronic device may be coupled to the conveyor and the first receiver that includes a driver that controls an intensity of the light emitted from the conveyor based on a feedback loop and using a reference signal, and wherein the electronic device includes at least one luminous intensity analyzer that analyzes the changes in intensity of the light received by the first receiver and outputs at least one signal. The temperature sensitive element may have a geometry that varies substantially proportionally to the temperature change.

The conveyor may directly face the first receiver, and wherein the light path between the conveyor and the receiver may be a gap between the conveyor and the first receiver. Alternatively, a target may be disposed to reflect incident light received from the conveyor to the first receiver. The target may include a two-face mirror having first and second faces disposed at an approximately 90 degree angle with respect to each other, the first face receiving from the conveyer incident light at a first incident angle of approximately 45 degrees and reflecting the incident light onto the second face at a second incident angle of approximately 45 degrees, the second face reflecting the incident light received from the first face to the first receiver. The target may includes a curved mirror. The target may be a flat mirror, and the conveyor may be angled with respect to the first receiver.

According further to the system described herein, a method of sensing temperature may include providing a conveyor that emits light and providing a first receiver that receives light emitted from the conveyor. At least a portion of the light emitted from the conveyor may be caused to be variably occulted before the light is received by the first receiver, wherein the portion of the light variably occulted varies according to a change in temperature. An intensity of the light emitted from the conveyor may be controlled according to a feedback loop using a reference signal. The reference signal may be caused to be received by a second receiver, wherein the reference signal is substantially independent of the change in temperature. The light received by first receiver may be analyzed and the change in temperature determined. A target may be provided that receives incident light from the conveyor and reflects the light to the first receiver.

According further to the system described herein, a temperature sensor includes a conveyor optical fiber that emits light, a mirror that reflects incident light received from the conveyor optical fiber, and a receiver optical fiber disposed to receive light reflected from the mirror. A temperature sensitive element may be disposed in a light path between the conveyor optical fiber and the first receiver optical fiber that variably occults at least a portion of the light emitted from the conveyor. The portion of light that may be variably occulted by the temperature sensitive element varies according to a temperature change of the temperature sensitive element. The mirror includes a two-face mirror having first and second faces disposed at an approximately 90 degree angle with respect to each other, the first face receiving from the conveyer incident light at a first incident angle of approximately 45 degrees and reflecting the incident light onto the second face at a second incident angle of approximately 45 degrees, the second face reflecting the incident light received from the first face to the first receiver. Alternatively, the mirror may include at least one of: a single flat mirror and a curved mirror. A reference optical fiber may be provided that receives a non-occulted portion of light from the conveyor, wherein the non-occulted portion of light received by the reference optical fiber is substantially independent of the change in temperature of the temperature sensitive element.

According further to the system described herein, a method of sensing temperature includes providing a conveyor optical fiber that emits light, providing a mirror that reflects light received from the conveyor, and providing a receiver optical fiber that receives light reflected from the mirror. At least a portion of the light emitted from the conveyor optical fiber may be caused to be variably occulted before the light is received by the first receiver, wherein the portion of the light variably occulted varies according to a change in temperature. A reference optical fiber may be provided that receives a non-occulted portion of light from the conveyor, wherein the non-occulted portion of light received by the reference optical fiber is substantially independent of the change in temperature of the temperature sensitive element.

According further to the system described herein, a temperature sensor includes a housing, a connection interface disposed on the housing, a conveyor disposed in the housing that emits light, and a receiver disposed in the housing that receives light emitted from the conveyor. A temperature sensitive element may be disposed in a light path between the conveyor and the first receiver that variably occults at least a portion of the light emitted by the conveyor, wherein the portion of light variably occulted by the temperature sensitive element varies according to a temperature change of the temperature sensitive element. An electronic device may be disposed in the housing, coupled to the receiver, and coupled to the connection interface. The electronic device may detect light received at the receiver, analyze the light received at the receiver and output a signal indicating a temperature based on a change in light intensity.

BRIEF DESCRIPTION OF THE DRAWINGS

Embodiments of the system are described with reference to the several figures of the drawings, in which.

DETAILED DESCRIPTION OF VARIOUS EMBODIMENTS

Referring now to the figures of the drawings, the figures comprise a part of this specification and illustrate exemplary embodiments of the described system. It is to be understood that in some instances various aspects of the system may be shown schematically or may be exaggerated or altered to facilitate an understanding of the system.

Figure 1:
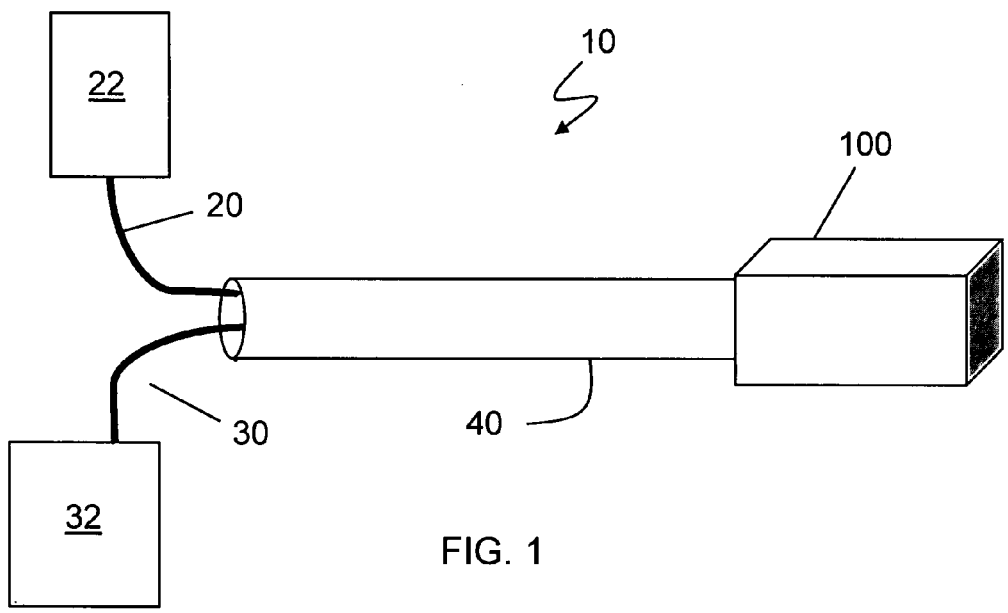
FIG. 1 is a schematic view of an embodiment of an optical temperature sensor according to the system described herein.

FIG. 1 is a schematic illustration of an embodiment of an optical temperature sensor 10 according to the system described herein. Optical fibers 20, 30 are positioned in a conduit 40 that is coupled to a fiber optic temperature sensor head 100. The conduit 40 may be opaque. One fiber optic 20 acts as a light emitter or conveyor and is coupled to a light source 22. The other fiber optic 30 acts as a light receiver and is coupled to a detector unit 32, such as a photometer. The fiber optic temperature sensor head 100 is attached to an object for which a determination of temperature is desired. Alternatively, in other embodiments, it is possible for one fiber optic to act as both the conveyor and the receiver. Although optical fibers are referenced in the figures, it is contemplated that other light conveyors and receivers are possible for use with the system described herein. For example, the system may be configured such that the light conveyor of the system is the direct light source mounted in the sensor head 100 without an intervening optical fiber.

Figure 2:
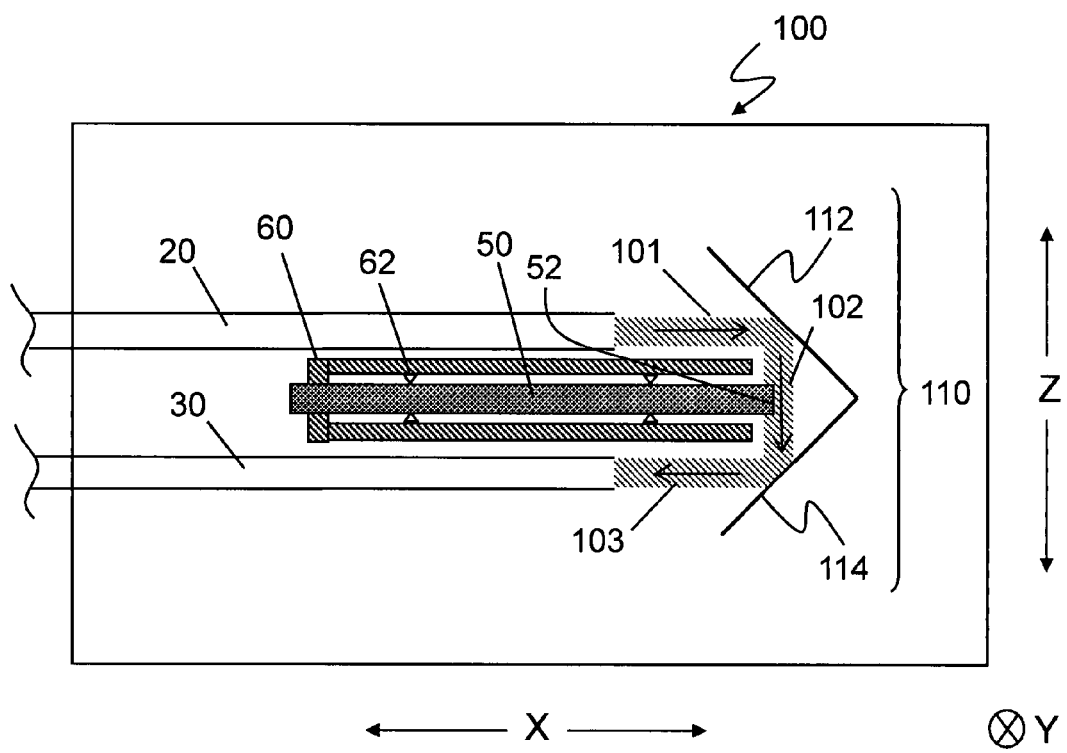
FIG. 2 is a schematic view of a sensor head for an optical temperature sensor according to the system described herein.
Figure 3:
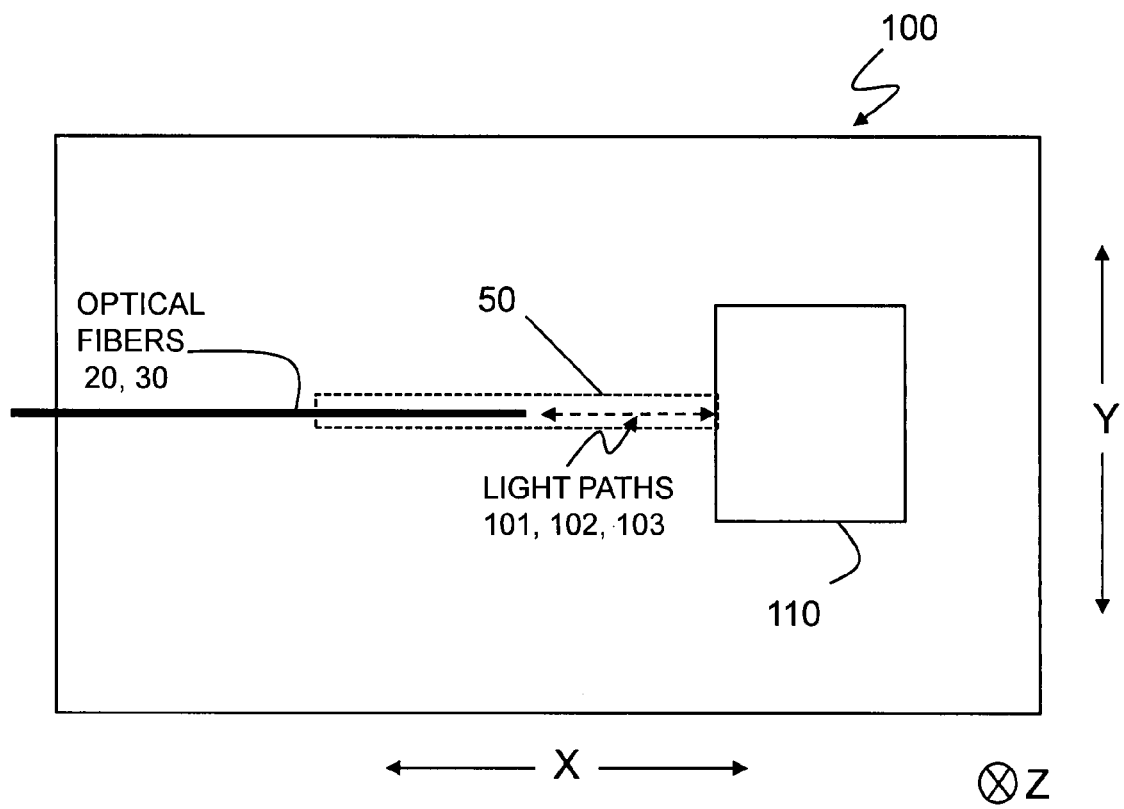
FIG. 3 is a differently oriented schematic view of the sensor head shown in FIG. 2 according to the system described herein.

FIGS. 2 and 3 illustrate differently oriented views of an embodiment of the sensor head 100 of the optical temperature sensor 10 according to the system described herein. The dimensions labeled "X", "Y", and "Z" illustrate the relative orientation of FIGS. 2 and 3 (and other figures). The sensor head 100 contains portions of the optical fibers 20, 30 that may be coupled together and solidly embedded in the sensor head 100. Ends of the fibers 20, 30 may face a reflective target, such as a mirror 110. The fibers 20, 30 may be rigidly fixed to the mirror 110 such that the fibers 20, 30 and mirror 110 all move together in the event of vibrations and/or other motion. In the embodiment, shown, the sensor head 100 has cubic proportions that allows the sensor head 100 to be placed in a number of positions so as to be flat against a surface of the object for which temperature is to be measured. In other embodiments, the sensor head may have at least one flat edge that contacts the object and/or at least one surface that substantially form fits or is in some way physically alignable, more or less, with the object. The sensor head may include any shape with markings thereon to indicate appropriate positioning of the sensor head against the object. The sensor head may be sized as desired according to criteria for its application of use.

Light of a given luminous intensity travels from the light source 22 through the fiber 20 and strikes a first reflecting surface 112 of the mirror 110 along a light path 101. The first reflecting surface of the mirror 110 may form an approximately 45° angle with the light path 101 of the incident light. The incident light may then be reflected with an approximately 90° angle along a light path 102 to the second reflecting surface 114 of the mirror 110 which forms an approximately 90° orthogonal plane with the first reflecting surface 112 of the mirror 110. As discussed below, an element having a predetermined thermal property may be disposed so as to obstruct and/or interfere with at least a portion of the light transmitted along the light path 102 in response to temperature. Incident light on the second reflecting surface 114 of the mirror 110 is reflected again along a light path 103 as light which is parallel to the initial incident light and oriented in the opposite direction of the initial incident light. The end of the second fiber 30 may be located so as to receive the light reflected from the second reflecting surface 114 along the light path 103 and the differential between the luminous intensities of the incident light conveyed by the fiber 20 and the reflected light received by the fiber 30 can be measured. The differential may be established by the detector 32 that may be a photometer, photoreceptor or other device to measure luminous intensity. The detector may be coupled to light-to-temperature computing equipment as further described elsewhere herein. The photometer and the light-to-temperature computing equipment may be part of a photoelectric temperature transducer. Note that angles other than those illustrated herein may be used.

A temperature sensitive element 50, such as a rigid strip made of non conductive material which possesses a predetermined coefficient of thermal expansion, may be disposed in the sensor head 100 on a fixed support 60, that may include a base and guide arms and/or other receptacle components, and where the temperature sensitive element 50 has an end 52 that partially occults the light along the light path 102 that is reflected from the first reflecting surface 112 of the mirror 110. In the illustrated embodiment, the partial occulting of the light along light path 102 occurs by expansion or contraction of the temperature sensitive element 50 in the X direction in response to temperature changes. In an embodiment, the more the temperature of the temperature sensitive element 50 increases, the more that temperature sensitive element 50 interferes with the incident light reflected from the surface 112 along the light path 102, and the more the intensity of light received by the fiber 30 decreases. In various embodiments, the portion of light variably occulted by the temperature sensitive element 50 may vary according to an approximately linearly proportional relationship with the temperature change, according the square of the temperature change and/or via some other temperature relationship. The system thus described transforms temperature changes into light intensity changes.

In an embodiment of the system described herein, use of a mirror enables the optical fibers to be placed in parallel, instead of opposite one another, so that the light emitting equipment and the light intensity analysis may be positioned on only one side of the temperature sensor, without having to pierce the two opposite sides of the apparatus or which part for which the temperature is to be measured.

The arrangement of the system described herein has at least the following advantages: it may be very small, may be made of non-conductive materials and the only moving part may be the thermal expansion of temperature sensitive element 50. To minimize friction on the lateral sides of temperature sensitive element 50, temperature sensitive element 50 may be elongated, with a minimum width and thickness, and its lateral points of contact may be limited to a minimum number of guides 62 affixed onto the support 60. The cantilevered length of the temperature sensitive element 50 at the end 52, and outside of the receptacle 60, may also be minimized to eliminate vibration effects on the end 52.

The system described herein advantageously includes a light emitting optical fiber and a light receiving optical fiber and relies upon the measurement of the change in light intensity received by the receiving optical fiber when the light emitted by the light emitting optical fiber is variably occulted by an opaque (or semi-opaque) body positioned on the light path between the emitting and the receiving fiber and which dimension varies with temperature. An advantage of such a system is that no metallic or conductive parts may be needed, which enables such temperature sensors to be used in electromagnetic and electric environments, such as electrical machines or apparatus. Additionally, another advantage is that only variations in light intensity may be measured, which enables the use of simpler and less costly light analysis equipment than, for example, interference analysis, Fabry-Perot analysis and/or light pattern analysis. For example, conversion from light intensity to temperature according to the system described herein may be made with a simple photoreceptor operating at the opposite end of receiving fiber.

Figure 4:
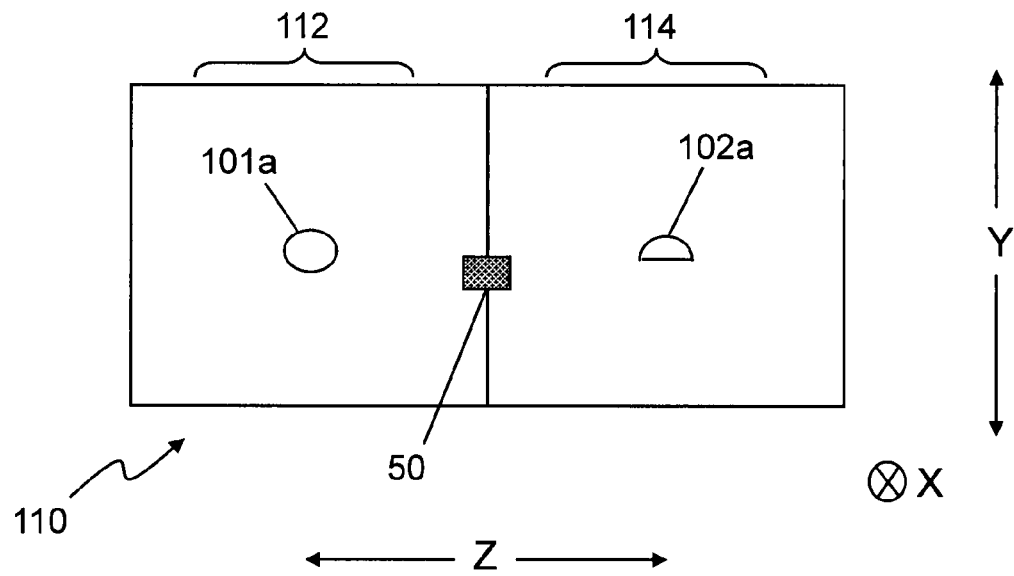
FIG. 4 is a schematic illustration of a two-face mirror incorporated into the sensor head, seen from the point of view of the incident light, according to the system described herein.

FIG. 4 is a schematic illustration of a two-face mirror incorporated into the sensor head, seen from the point of view of the incident light, according to the system described herein. Light strikes the first reflecting surface 112 of the mirror 110, forming a luminous spot 101a, which may be circular in the case of cylindrical projection of the light from the fiber 20. The fiber 20 and mirror 110 may be positioned in such a way that incident light creates the luminous spot 101a that is then reflected onto the second reflecting surface 114 of the mirror 110. A portion of the light impinging the second reflecting surface 114 is occulted due to movement of the temperature sensitive element 50 in the X direction, while a different portion of the light is reflected as a luminous spot 102a into the fiber 30. The term "portion" used in the context herein may refer to one or more areas or subsets and which, in the case of multiple areas or subsets, may be integrally connected or separate from one other.

In an embodiment, the differential between the luminous intensities of the incident light conveyed by the fiber 20 from the light source 22 and the reflected light received by the fiber 30 results from increase or decrease of the size of the luminous spot 102a that is reflected from the surface 114 and received by the optical fiber 30. A first amount of the light on the light path 102 is occulted and/or otherwise interfered with by the temperature sensitive element 50 while a second amount of the light on the light path 102 is conveyed as luminous spot 102a. The first amount may be inversely proportional to the second amount in that when the first amount increases the second amount decreases and vice versa. The sum of the first amount and second amount may be a substantially constant value. In some cases, the first amount or the second amount could be zero.

Figure 5:
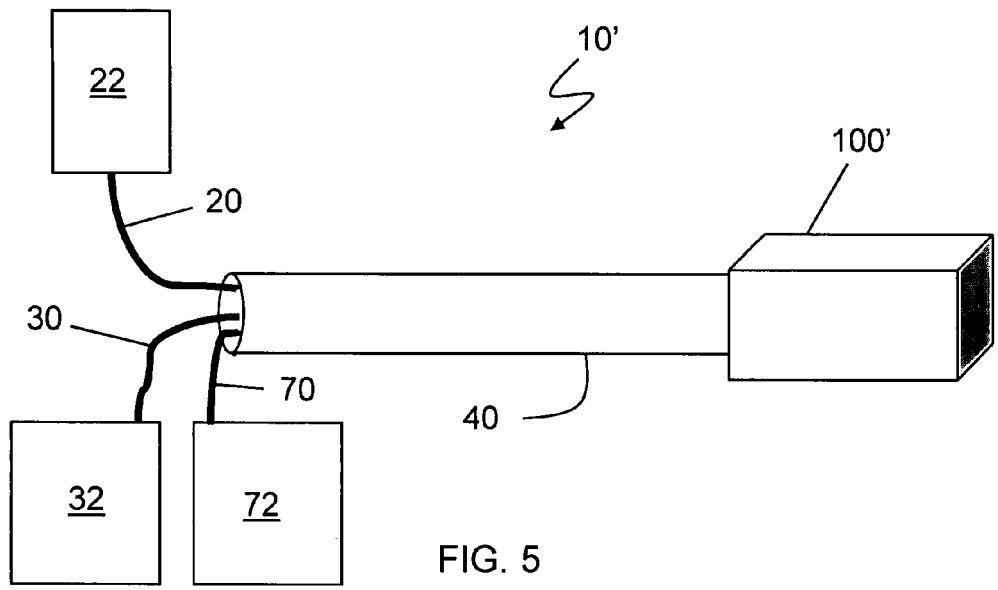
FIG. 5 is a schematic view of another embodiment of the optical temperature sensor including a third optical fiber according to the system described herein.

FIG. 5 illustrates another embodiment of the system described herein showing a fiber optic temperature sensor 10' in which a third optical fiber 70 may be positioned in the conduit and coupled to a fiber optic temperature sensor head 100'. The optical fiber 70 may be a reference optical fiber that is disposed alongside or adjacent to the receiver optical fiber 30 and connected to a reference detector unit 72, such as a photometer that may be the same type of photometer as the detector unit 32. As further discussed elsewhere herein, the reference optical fiber 70 may allow for continuous re-calibration of the light intensity measurements made over time by the detector 32.

Figure 6:
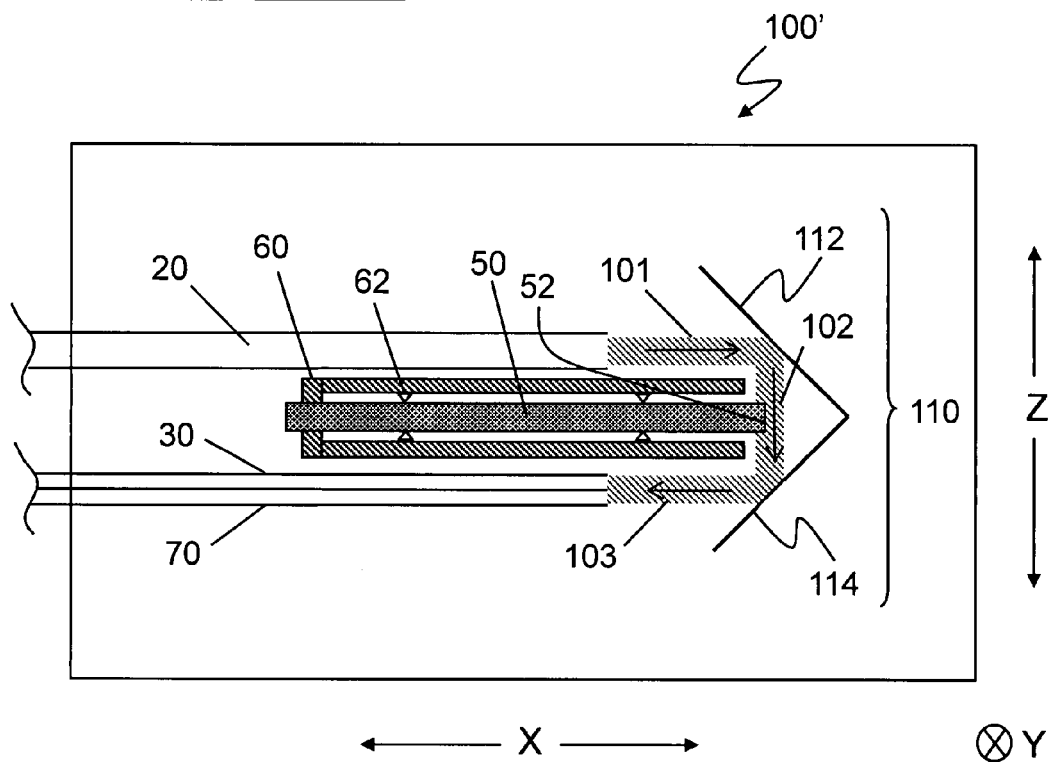
FIG. 6 illustrates an arrangement of a reference optical fiber in the sensor head where the reference optical fiber is disposed alongside the receiver optical fiber according to an embodiment of the system described herein.

FIG. 6 illustrates an arrangement of the reference optical fiber 70 in the sensor head 100' where the reference optical fiber 70 is disposed alongside the receiver optical fiber 30. The reference optical fiber 70 may be disposed such that the temperature sensitive element 50 does not interfere with the light received by the reference optical fiber 70 regardless of temperature. The arrangement using the reference optical fiber 70 allows the light-to-temperature conversion transducer to correct by continuous re-calibration of the light intensity measurements made over time by the photometer 32 connected to fiber 30 by taking into account the light sensitivity drifts due to the aging of the photometer, ambient temperature variations, the temperature variations of the electronics connected to fibers 20 and 30 and/or the light intensity drift due to the aging of the fiber optics and/or the aging of the light emitter, as such drifts are captured by the reference fiber 70.

Figure 7:
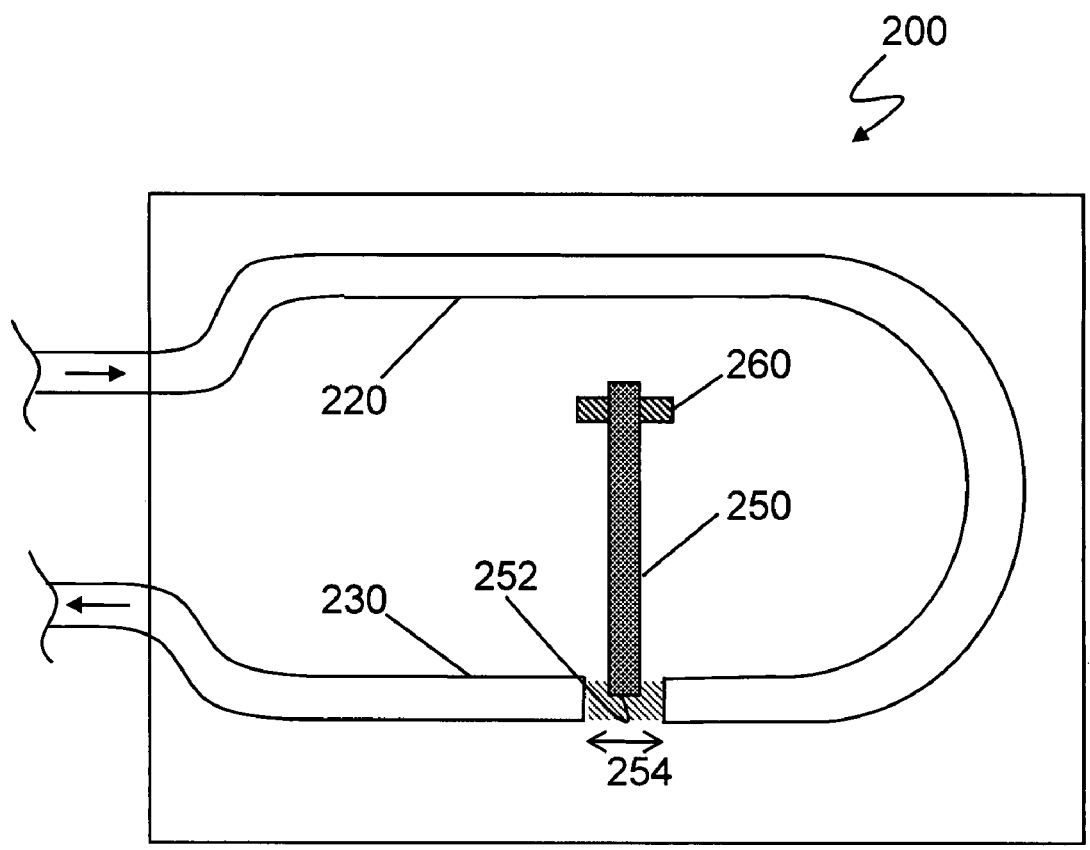
FIG. 7 is a schematic illustration showing another embodiment of the system described herein in which light emitted from the conveying optical fiber is received directly by the receiving optical fiber without an intervening mirror.

FIG. 7 is a schematic illustration showing another embodiment of a sensor head 200 system described herein in which light emitted from a conveying optical fiber 220 is received directly by a receiving optical fiber 230 without an intervening mirror. The two optic fibers 220, 230 may each have one of their ends facing each other across a small gap 254. As further discussed elsewhere herein, the fiber 220 may be coupled to a light source 222 and the fiber 230 may transmit received light to a detector 232 and/or a luminous intensity analyzer unit for conducting luminous intensity and temperature analysis as further described elsewhere herein. The detector 232 may be a simple photometer that translates light intensity into electrical current, and electricity into temperature. In this case, the relationship between light intensity change and temperature change can be approximated as linear, as explained elsewhere herein. At least one of the fibers 220, 230 (for example, fiber 220 as shown) may be appropriately curved to have its end face the end of other fiber.

The temperature sensitive element 250, such as a rigid strip made of non conductive material which possesses a predetermined coefficient of thermal expansion, is fixed at one end 252 on a fixed support 260 and has its other end penetrate into the gap 254 according to its thermal expansion. As the length of the temperature sensitive element 250 changes, the element 250 expands into or retracts from the gap 254 according to the change in temperature of the element 250 that causes the respective increase or decrease of the element 250. For example, the temperature sensitive element 250 may interfere with the incident light coming out of the end of fiber 220 such that the more the temperature increases, the more the intensity of light received by fiber 230 decreases. The system thus described transforms temperature changes into light intensity changes. It also possible to incorporate into this embodiment the reference optical fiber as further discussed elsewhere herein.

Figure 8:
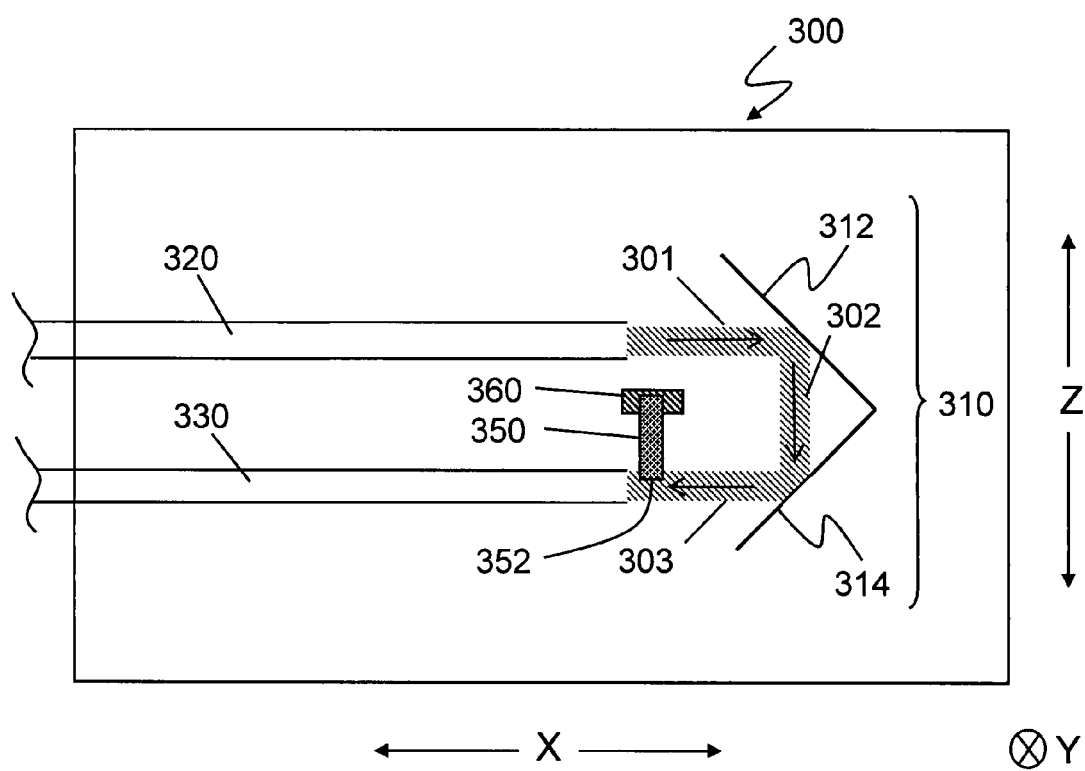
FIG. 8 is a schematic illustration of another embodiment of the system described herein showing occultation of an incident light by a temperature sensitive element disposed transversally to the optical fibers.

FIG. 8 is a schematic illustration of another embodiment of a sensor head 300 according to the system described herein showing occultation of an incident light by a temperature sensitive element 350 disposed transversally to optical fibers 320, 330. As shown in FIG. 8, a mirror 310 may include two faces 312, 314 disposed at 90° with respect to one another and the temperature sensitive element 350 disposed transversally to the fibers 320, 330. It also possible to incorporate into this embodiment the reference optical fiber as further discussed elsewhere herein.

Figure 9:
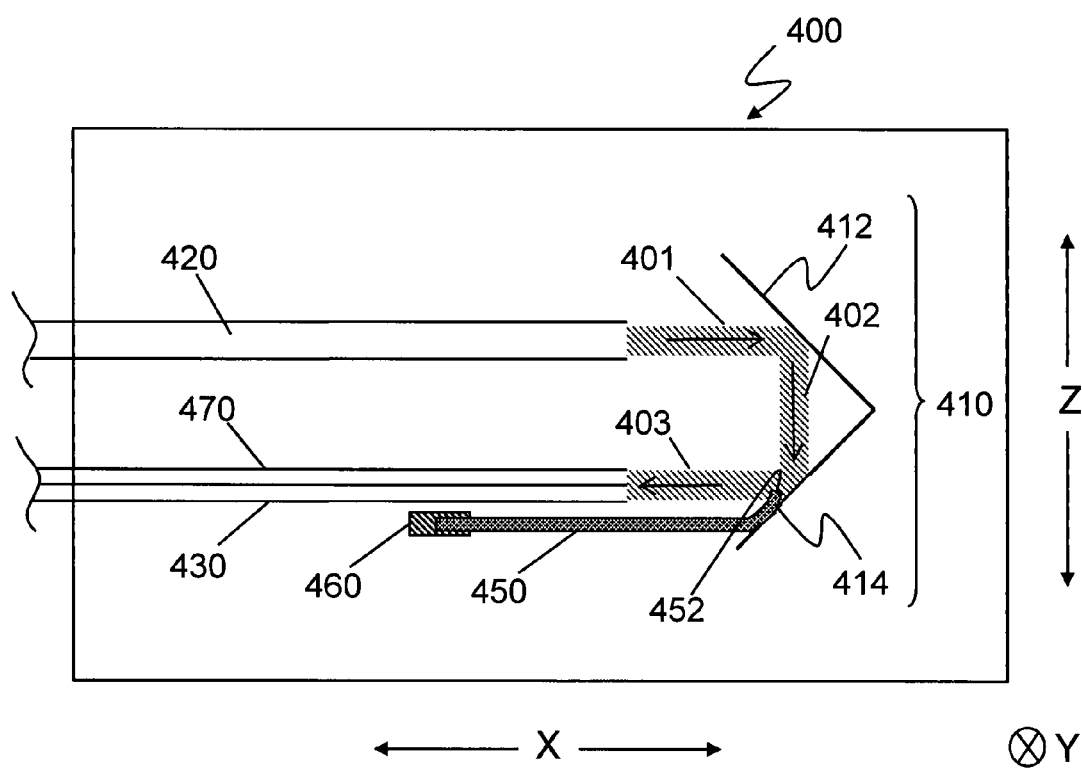
FIG. 9 is a schematic illustration of another embodiment of the system described herein showing another configuration of the optical fibers and the temperature sensitive element.

FIG. 9 is a schematic illustration of another embodiment of a sensor head 400 according to the system described herein showing another configuration of optical fibers 420, 430, 470 and a temperature sensitive element 450. The temperature sensitive element 450 abuts tangentially on a mirror face 414 of a mirror 410 and an end 452 of the element 450 occults light along light path 402, as further discussed elsewhere herein. As shown in the illustrated embodiment of FIG. 9, the fiber 470 is a reference fiber disposed between light conveying optical fiber 420 and the light receiving optical fiber 430 in accordance with operation of the reference fiber 470 to receive light unobstructed by movement of the temperature sensitive element 450 in response to temperature changes. This arrangement may be advantageous for environments that are subjected to mechanical vibrations, since cantilever effects upon the temperature sensitive element 450 are minimized.

Another interesting feature of the use of the 90° two-face mirror 410 and which is apparent on FIG. 9 is that if the end of fiber 420 is circular, a cross-section of light reflected along path 402 between surface 412 and surface 414 of mirror 410 mirror will be oval. By appropriately restricting the dimensions of mirror face 412, the portion of light reflected along light path 402 may be truncated into a square or a rectangle, causing the variation of light due to dilation or retraction of temperatures sensitive element 450 to be advantageously more linear than with an oval section.

Other sensor head configurations may be used in accordance with the system described herein.

Figure 10A:
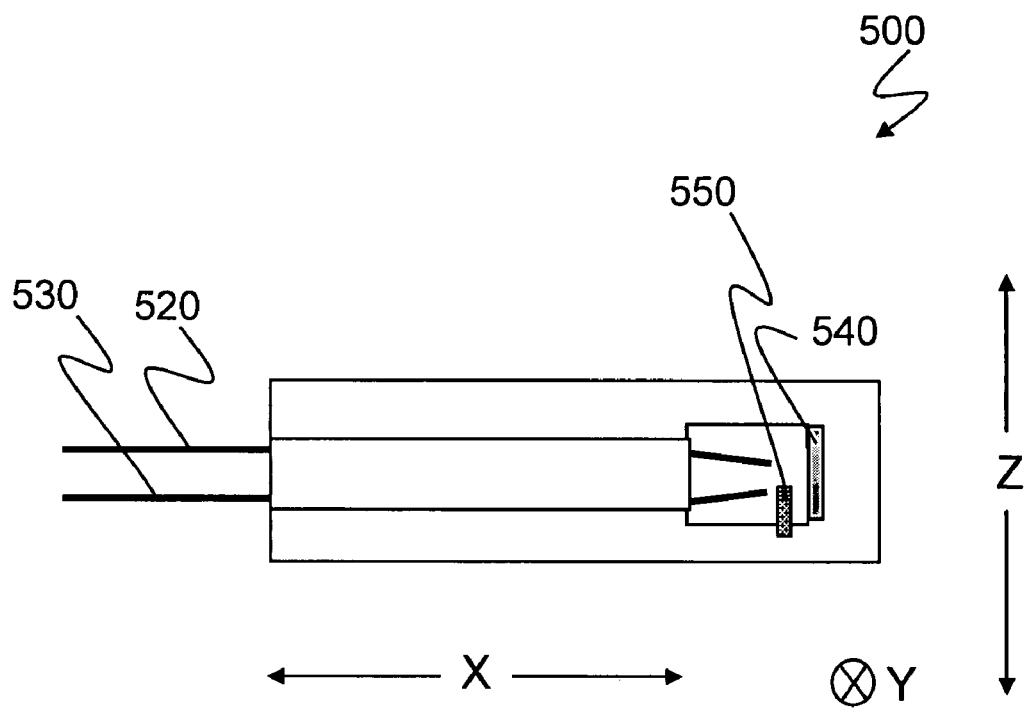
FIGS. 10A and 10B are schematic views of a sensor head having an alternative configuration in which a receiver is oriented with respect to a conveyor so as to receive light emitted from the conveyor when reflected from a flat mirror according to another embodiment of the system described herein.
Figure 10B:
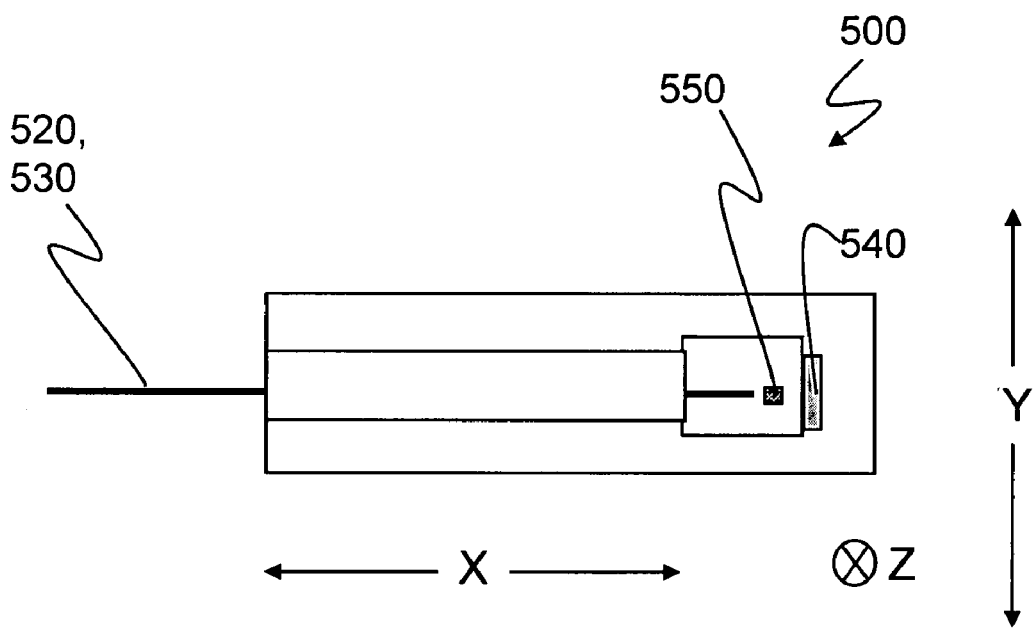

FIGS. 10A and 10B are schematic views of a sensor head 500 having an alternative configuration in which a receiver 530 is oriented with respect to a conveyor 520 so as to receive light emitted from the conveyor 520 when reflected from a flat mirror 540 according to another embodiment of the system described herein. In FIG. 10A, the sensor head 500 is shown from one perspective and in FIG. 10B, the sensor head 500 is shown from an orthogonal perspective to that shown in FIG. 10A. The flat mirror 540 may be a single element that does not contain an angle. The conveyor 520 is oriented with respect to the receiver 530 in a convergence orientation so that light emitted from the conveyor 520 is reflected once from the mirror 540 and the reflected light is received by the receiver 530. A temperature sensitive element 550 is disposed to obstruct or interfere with a least of portion of the light received by the receiver 530, as further discussed elsewhere herein. The temperature sensitive element 550 is shown disposed between the mirror 540 and the receiver 530; however, in other embodiments, the temperature sensitive element 550 may be disposed between the conveyor 520 and the mirror 540 and/or between the conveyor 520 and the receiver 530 and/or at any combination of the configurations described herein. In another embodiment, the conveyor 520 and the receiver 530 may be positioned adjacent to one another, e.g. touching one another, which would reduce the angle of the convergence.

Figure 11A:
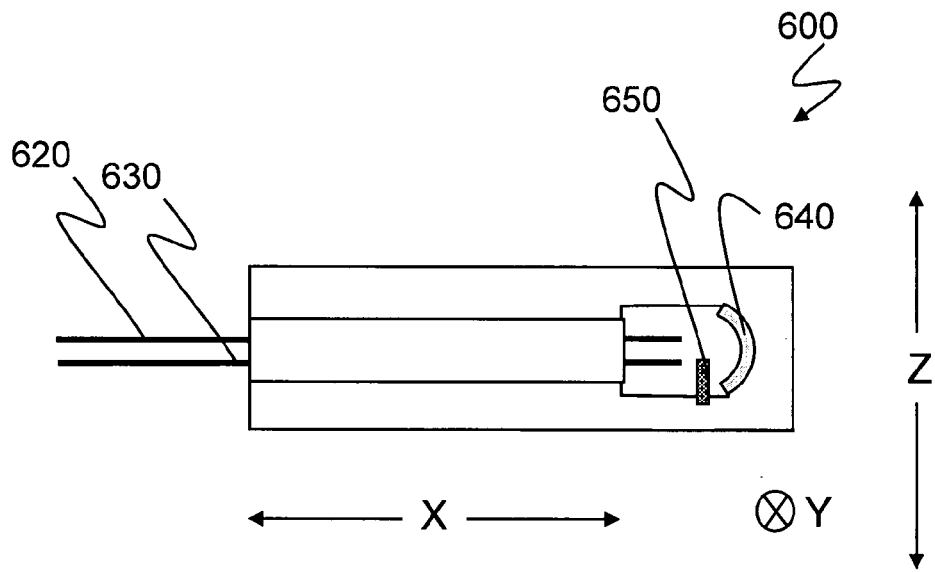
FIGS. 11A and 11B are schematic views of a sensor head having a curved mirror according to another embodiment of the system described herein.
Figure 11B:
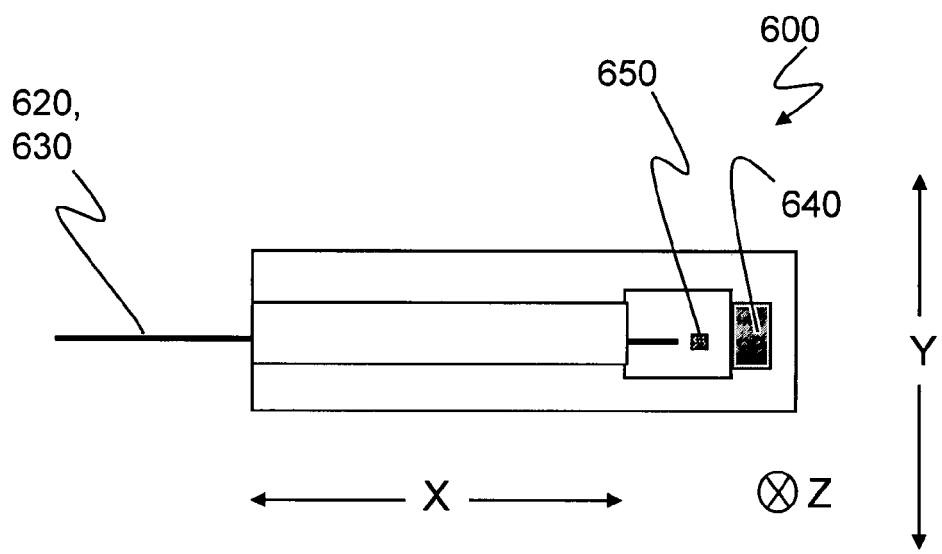

FIGS. 11A and 11B are schematic views of a sensor head 600 having a curved mirror 640 according to another embodiment of the system described herein. In FIG. 11A, the sensor head 600 is shown from one perspective and in FIG. 11B, the sensor head 600 is shown from an orthogonal perspective to that shown in FIG. 11A. A conveyor 620 may be positioned parallel to a receiver 630. Light emitted from the conveyor 620 is reflected from the curved mirror 640 to the receiver 630. As illustrated, the curved mirror 640 may have a concave shape with respect to the conveyor 620 and the receiver 630. Other deformations of the mirror 640 are possible. A temperature sensitive element 650 is disposed to obstruct or interfere with a least of portion of the light received by the receiver 630, as further discussed elsewhere herein. The temperature sensitive element 650 is shown disposed between the mirror 540 and the receiver 630; however, in other embodiments, the temperature sensitive element 650 may be disposed between the conveyor 620 and the mirror 640 and/or between the conveyor 620 and the receiver 630 and/or at any combination of the configurations described herein.

In other embodiments, one or more light deforming lenses may be disposed between either the conveyor 620 and/or the receiver 630 and the curved mirror 640 to change the geometry of the incident light at the mirror 640 and/or the geometry of the reflected light received at the receiver 630 and used in conjunction with the temperature sensitive element 650. For example, the lens may transform a circular incident light shape into a light shape having an elongated geometry, such as a flat rectangle. In this way, the amounts of light received at the receiver may vary according to the movement of the temperature sensitive element 650 and in connection with the transformed shape of the light beam caused by the lens.

Figure 12:
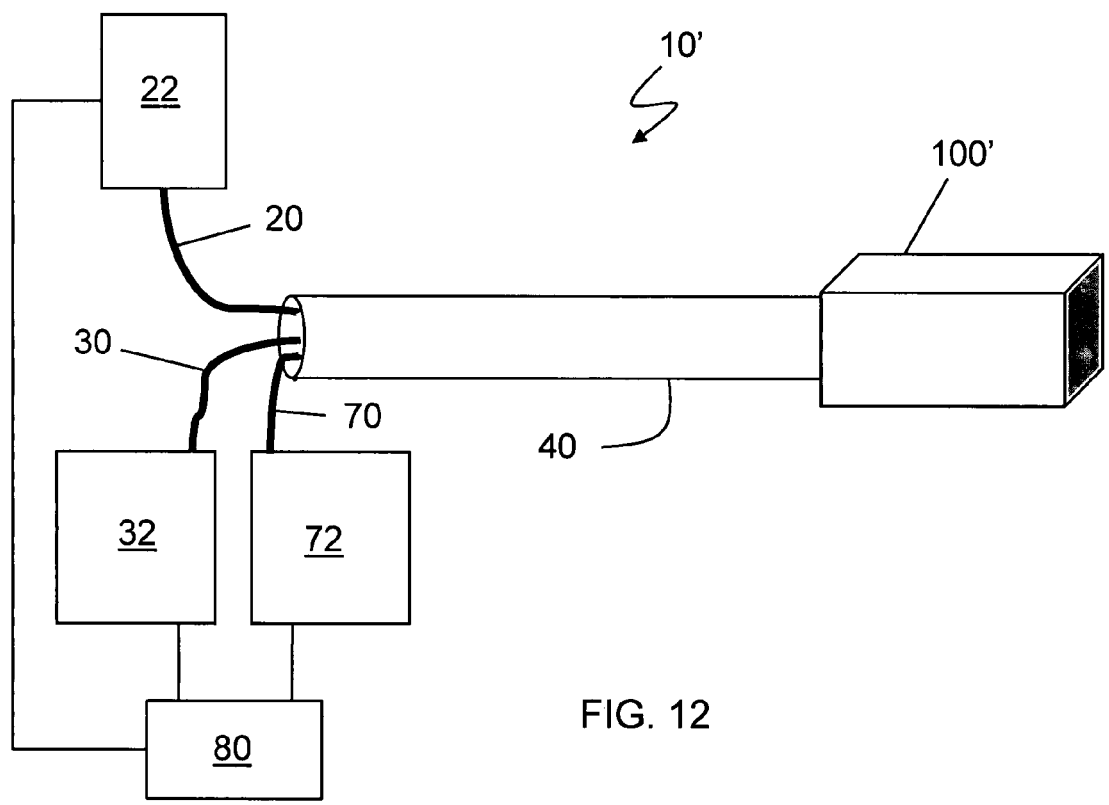
FIG. 12 shows a schematic illustration of an optical temperature sensor including a luminous intensity analyzer that may include temperature calculating components that may translate the variations in luminous intensity into the changes in temperature of the temperature sensitive element according to an embodiment of the system described herein.

FIG. 12 shows a schematic illustration of an optical temperature sensor 10' having similar components as further described elsewhere herein and additionally illustrating a luminous intensity analyzer 80 that may include temperature calculating components that may translate the variations in luminous intensity into the changes in temperature of the temperature sensitive element 50. The luminous intensity analyzer 80 may include analog-to-digital conversion circuitry and/or appropriate computing circuitry (e.g., a conventional processing device such as a PC) and/or output circuitry (e.g., a display or appropriate circuitry to output a digital or analog signal indicative of the temperature change).

The luminous intensity analyzer 80 may be a stand-alone meter and/or other analyzer unit that is coupled to the detector 32 and/or the light source 22 to analyze the differential between the conveyed light from the light source 22 and the light received by detector 32 and determine the change in temperature of the temperature sensitive element 50 (and, accordingly, the object to which the optical temperature sensor is attached or otherwise coupled) based on the change in light intensity. Alternatively, the luminous intensity analyzer 80 may form a part of the detector 32, for example as a processor component therein. The luminous intensity analyzer 80 may be used in conjunction with any of sensors described herein.

In various embodiments, the sensor may be fabricated using no metallic or electrically-conductive parts so as to allow operation in an environment having an electric or electromagnetic field. For example, non-electrically conducting fiber optical material may be used for the conveyor and the receiver, a non-electrically conductive material having a known coefficient of thermal expansion may be used for the temperature sensitive element, as further described herein, and various ceramic materials used for other components that may be selected depending on particular criteria for an application. For example, materials may be selected that are suitable for low temperature operation, room-temperature operation and/or high temperature operation or selected as suitable materials over a varying temperature range. In particular, for example, the opaque conduit containing the conveyor and the receiver may be comprised of commercially-available ceramics, and the outer housing of the sensor head may be comprised of commercially-available ceramics. In an embodiment herein, the ceramic material may be Macor® machinable glass ceramic provided by Corning Incorporated of Corning, N.Y., although any other suitable materials, such as other machinable glass ceramic materials, may be used.

In various embodiments, practical operation of the system described herein utilizing the simple light occultation principle described may include various design choices for materials and configurations, including: taking into account the electrically non-conductive, but heat-conductive materials to be chosen, the overall size to be minimized, the ruggedness, particularly the resistance to vibrations to be maximized, and the simplicity and low cost of the light intensity analyzing equipment and temperature calculating equipment to be used, as further discussed below.

The material constituting the temperature sensitive element may be electrically non-conductive but rigid and have a thermal expansion coefficient which is sufficiently high to cause the length of temperature sensitive element to vary sufficiently with the temperature. In an embodiment, a suitable material may be glass microfiber-reinforced Teflon® such as RT/duroid® 5880 PTFE laminate from Rogers Corporation, which has a coefficient of thermal expansion of 18.7 mm/m in at least one direction. It should be noted that materials may have different coefficients of thermal expansion in different directions, such as length, width, depth, and the system described herein may be designed with a temperature sensitive element of a material selected for thermal expansion properties in one or more directions.

The sensor head containing the system described herein may be hermetically sealed from dust, light and vapor, and made of a electrically non-conductive material which enables temperature of the temperature sensitive element to quickly adopt the temperature which is to be measured. In an embodiment, a suitable material has been found to be FR4 from Rogers Corporation.

Dimensions of the overall sensor may be minimized. In an embodiment, referencing for example the sensor 10', the optical fibers 20, 30, 70, may have a diameter of approximately four hundred twenty microns (excluding exterior opaque cladding), each surface 112, 114 of mirror 110 may have dimensions as small as approximately nine hundred twenty microns in height, approximately five hundred microns of thickness and approximately four mm in length, with a dielectric reflecting coating of 98% reflection for a 45° angle for wave lengths in the range of eight hundred to eight hundred seventy nanometers obtained from Unaxis Optics. The temperature sensitive element 50 may be a strip having a length of approximately 2 cm for the measurement of temperatures above approximately minus 40° C. and less than approximately 200° C., a width of approximately two hundred fifty microns and a thickness of approximately seven hundred fifty microns. The light source 22 may be an appropriate light source capable of providing the functionality described herein, including LED's and laser diodes, among others, such as a light emitting diode obtained from Dialight PLC in the United Kingdom. The operational performance of the system described herein may allow measurement of temperatures from −40° C. to 200° C. with a precision of plus or minus 2° C. which corresponds to variation of light intensity resulting from a displacement of the temperature sensitive element of approximately three hundred microns The resulting sensor head 100 may have dimensions of approximately 3 cm×1 cm×2 mm.

Figure 13:
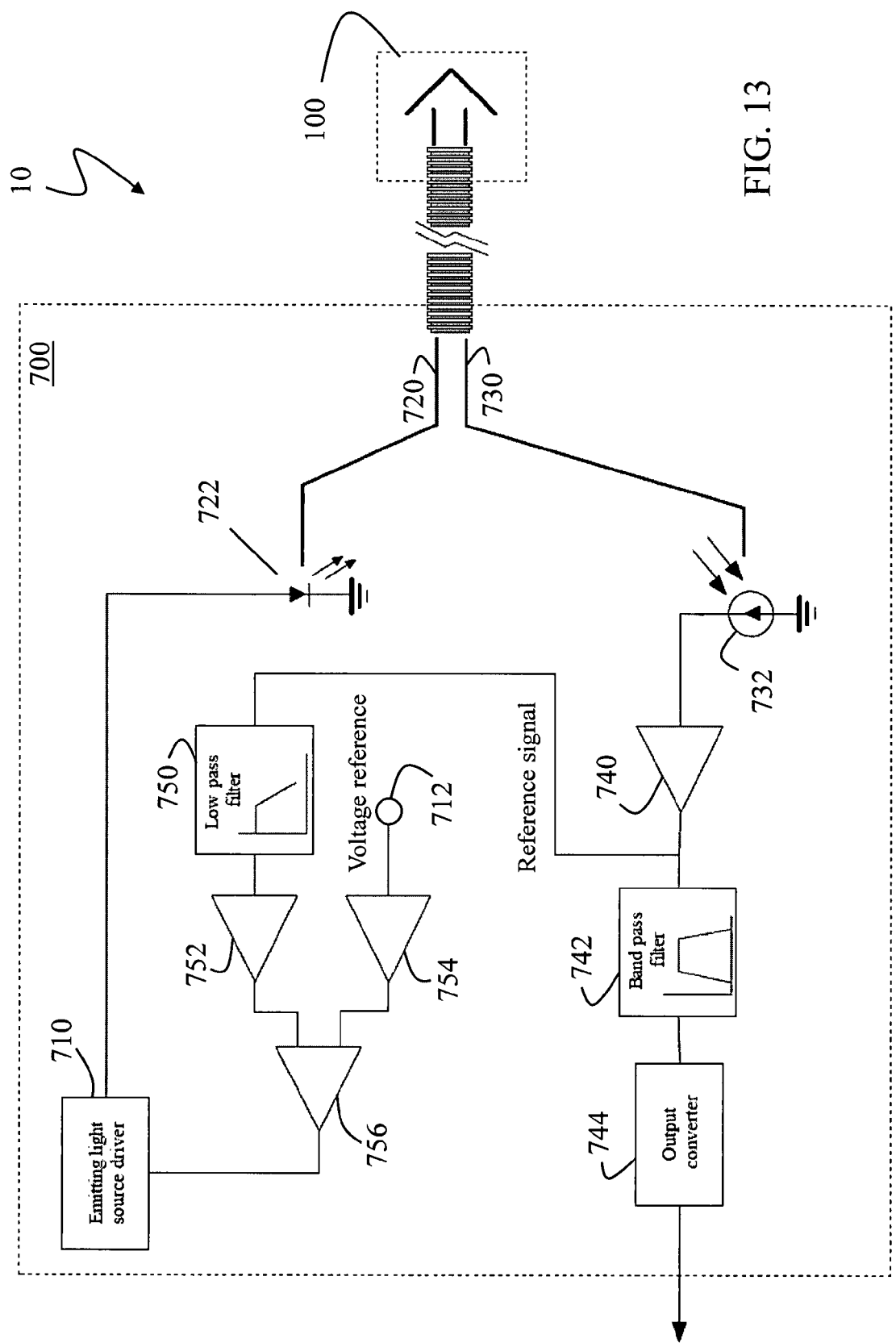
FIG. 13 is a schematic circuit diagram of an electronic device coupled to a sensor head of an optical temperature sensor according to an embodiment of the system described herein.

FIG. 13 is a schematic circuit diagram of an electronic device 700 coupled to the sensor head 100 of the optical temperature sensor 10 according to an embodiment of the system described herein. The design and components of the sensor head 100 are described elsewhere herein. As discussed in detail below, the electronic device 700 may control an amount of light irradiated on the target within the sensor head 100 substantially independent of temperature and/or temperature change of the sensor head 100, for example by modulating an intensity of the light irradiated on the target. The electronic device 700 may be coupled to the sensor head 100 via a pair of optical fibers 720, 730 positioned in a conduit, like the conduit 40, described above. The fiber 720 may be a light conveying fiber optic cable and the fiber 730 may be a light receiving fiber optic cable, although any other appropriate light conveyers and/or receivers may be used. A light emitting source 722 provides light that is conveyed by the fiber 720 to the sensor head 100. A light emitting source driver 710 may be coupled to the light emitting source 722 and control the light emitted from the source 722 using a feedback loop through a low-pass filter, as further discussed herein. The fiber 730 transmits received light from the sensor head 100 to a measurement unit, such as measurement photoelectric cells 732.

As shown in FIG. 13, the output of the measurement photoelectric cells 732 may be coupled to an amplifier 740 that may act as a high impedance buffer for a voltage signal input thereto. The output of the amplifier 740 may be coupled separately to a band-pass filter 742 and to a low-pass filter 750, as further discussed herein. The band-pass filter 742 may be configured to eliminate signals that are not of interest, for example, voltage drifts in the low frequency range and high frequency signals unrelated to temperature change. It is understood that other filters and combinations thereof, including low-pass filters and high-pass filters, may be used as appropriate. The output of the band-pass filter 742 may be coupled to an output converter 744 that may provide an output signal from the electronic device 700. As further discussed elsewhere herein, the output converter 744 may include an analyzer that analyzes the signal to determine temperature change and/or other measured characteristics of the object that is the subject of measurement. The output signal from the output converter 744 may be transmitted to a display for displaying a measure of the temperature change of the object. Alternatively, the output of the output converter 744 may be transmitted to a processor, an analyzer and/or other system that uses the output signal.

In a feedback loop of the system, the output of the low-pass filter 750 may be coupled to an amplifier 752 that may act as a high impedance buffer for a voltage signal input thereto. The low-pass filter 750 may be used to obtain a mean value signal as a reference signal used for feedback to the light emitting source driver 710. The effects of movement caused by vibration on the reference signal are lessened by application of the low-pass filter 750 to the input signal. The output from the amplifier 752 may be coupled as an input to a differential amplifier 756. Another input to the differential amplifier 756 may be the output of an amplifier 754 that has an input coupled to a voltage reference 712. The amplifier 754 may act as a high impedance buffer for voltage signals input thereto. The differential amplifier 756 outputs a difference between signals input thereto. The output from the differential amplifier 756 may be coupled to the light emitting source driver 710 to control intensity of light emitted from the light emitting source 722.

The system described herein may be calibrated for mismatches or differences in fiber cuts, photoelectric cell sensitivity, fiber attenuation, etc. In addition to calibration, the feedback may compensate for variations in the fiber characteristics, light emitting source, photoelectric cells, etc., caused by aging or manipulation.

Figure 14:
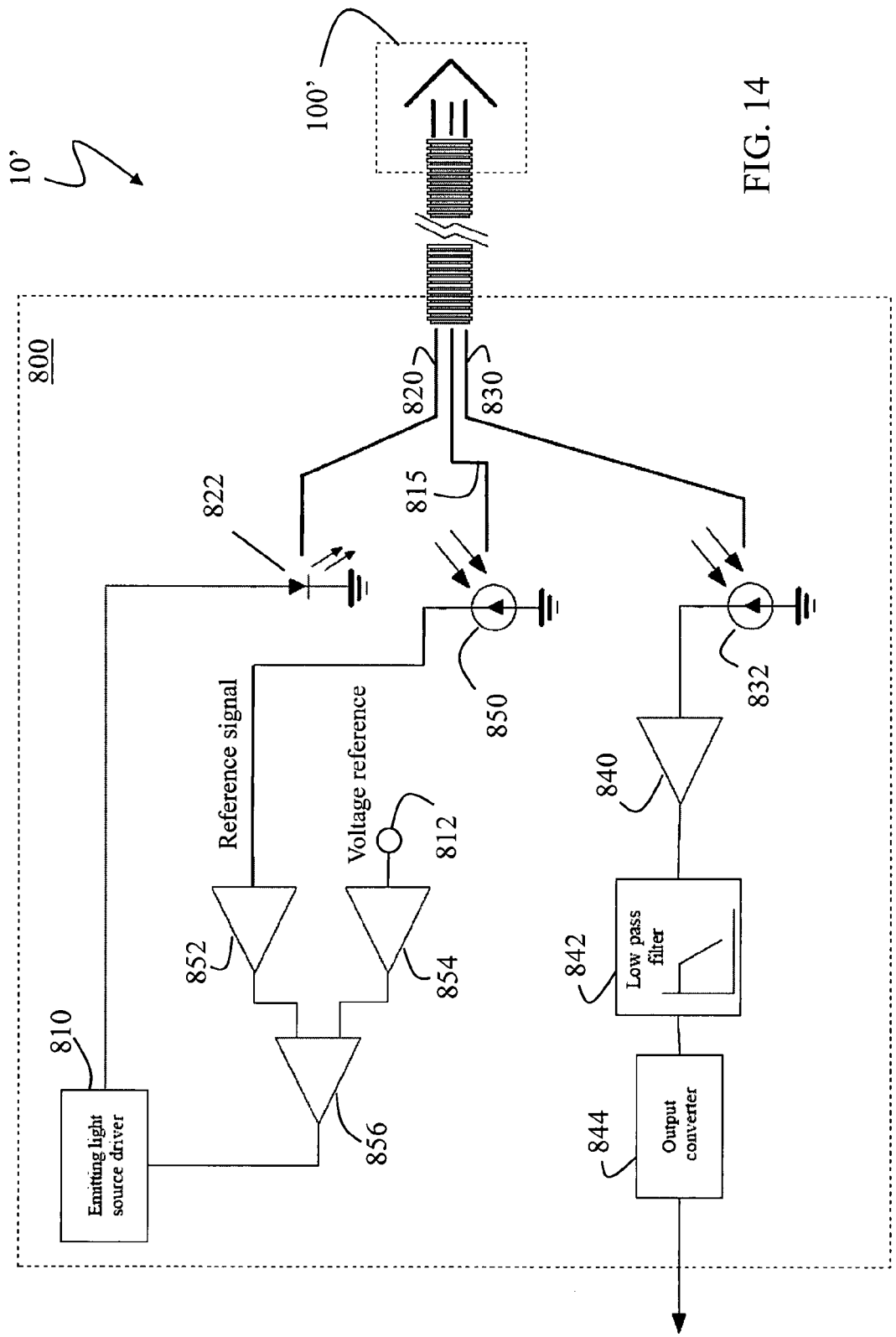
FIG. 14 is a schematic circuit diagram of an electronic device coupled to a sensor head of an optical temperature sensor according to another embodiment of the system described herein.

FIG. 14 is a schematic circuit diagram of an electronic device 800 coupled to a sensor head 100' of the optical temperature sensor 10' according to another embodiment of the system described herein. The design and components of the sensor head 100' are described elsewhere herein. As shown, the sensor head 100' may be electrically coupled to the electronic device 800 via a reference optical fiber 870, a light conveying optical fiber 820 and a light receiving optical fiber 830. As discussed in detail below, the electronic device 800 may modulate an amount of light irradiated on the target within the sensor head 100' substantially independent of temperature change within the sensor head 100'. The sensor head 100' may be similar to the sensor head 100 described above in reference to the electronic device 200 with the addition of the reference fiber 870 and possibly other differences as noted herein. As further discussed elsewhere herein, the reference optical fiber 870 may be disposed in the sensor head 100' so as to receive light emitted from the light conveying fiber 820 and/or some other light source where the amount of light from the reference fiber 870 is substantially independent of temperature change within the sensor head 100'.

A light emitting source 822 may provide light that is conveyed by the fiber 820 to the sensor head 100'. A light emitting source driver 810 may be coupled to the light emitting source 822 and may use a reference signal to control the light emitted from the source 822, as further discussed herein. The fiber 830 transmits received light from the sensor head 100' to a measurement unit, such as measurement photoelectric cells 832. The fiber 870 transmits received light from the sensor head 100' to a reference unit, such as reference photoelectric cells 850. Note that instead of the fibers 820, 830, 870 it may be possible to use any appropriate light conveyers and/or light receivers.

The output of the reference photoelectric cells 850 may be coupled to an amplifier 852 that may act as a high impedance buffer for voltage signals input thereto. The output of the amplifier 852 may be coupled to an input of a differential amplifier 856. Another input of the differential amplifier 856 may be the output of an amplifier 854 where the amplifier 854 has a voltage reference input 812. The amplifier 854 may act as a high impedance buffer for voltage signals input thereto. The differential amplifier 856 outputs a difference between signals input thereto. The output of the differential amplifier 856 may be coupled to the light emitting source driver 810 which uses an output signal from the differential amplifier 356 to control intensity of light emitted from the light emitting source 822. Other known circuitry may be used with the system described herein; for example, in another embodiment (not shown), the output of the reference photoelectric cells 850 may be coupled to a low-pass filter that may be used to obtain a mean value of the reference signal and thereby lessen the effects on the reference signal of undesirable high frequency signals.

As shown in FIG. 14, output of the measurement photoelectric cells 832 may be coupled to an amplifier 840, which may act as a high impedance buffer for voltage signals input thereto. The output of the amplifier 840 may be coupled to a low-pass filter 842. The low-pass filter 842 may be configured to eliminate signals that are not of interest, for example, very high frequency signals unrelated to temperature change. It is understood that other filters and combinations thereof, including band-pass filters and high-pass filters, may be used as appropriate. The output of the low-pass filter 842 may be coupled to an output converter 844 that may provide an output signal from the electronic device 800. As further discussed elsewhere herein, the output converter 844 may include an analyzer that analyzes the signal to determine measured characteristics of the object that is the subject of measurement. The output signal from the output converter 844 may be transmitted to a display for displaying temperature. Alternatively, the output of the output converter 844 may be transmitted to a processor, an analyzer and/or other system that uses the output signal.

It should be noted that the electronic devices 700, 800 described above may each incorporate the light source 22, the detector 32, the reference detector 72 and/or the luminous intensity analyzer 80 described elsewhere herein. Additionally, in various embodiments, materials selected for fabrication of the system described herein may have mechanical properties selected specifically to reduce deformations that may result in measurement errors. For example, selected fabrication materials may have high compressive strength, high flexural strength, high continuous service temperature, and high dielectric constant, among other properties as described elsewhere herein. Reference fibers, as further discussed elsewhere herein, may also be used with any of the above-described sensor types. Further, the electronic devices 700, 800 described herein may be used in conjunction with any of the above-described sensor types.

Figure 15:
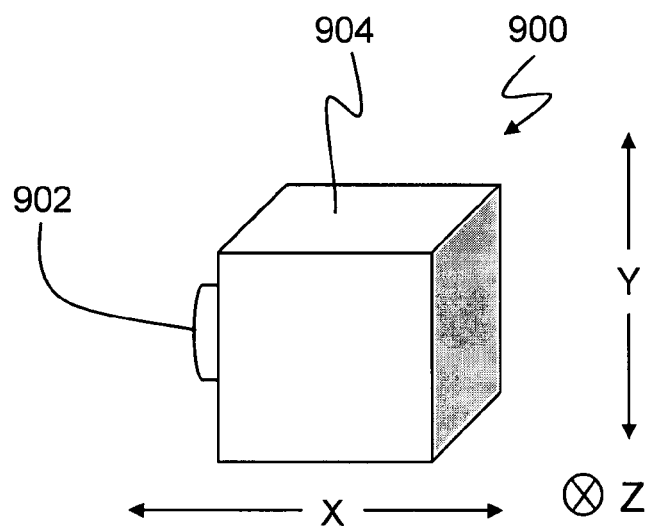
FIGS. 15, 16 and 17 are schematic views from different directions of an integrated, compact sensor for measurement of temperature according to another embodiment of the system described herein.
Figure 16:
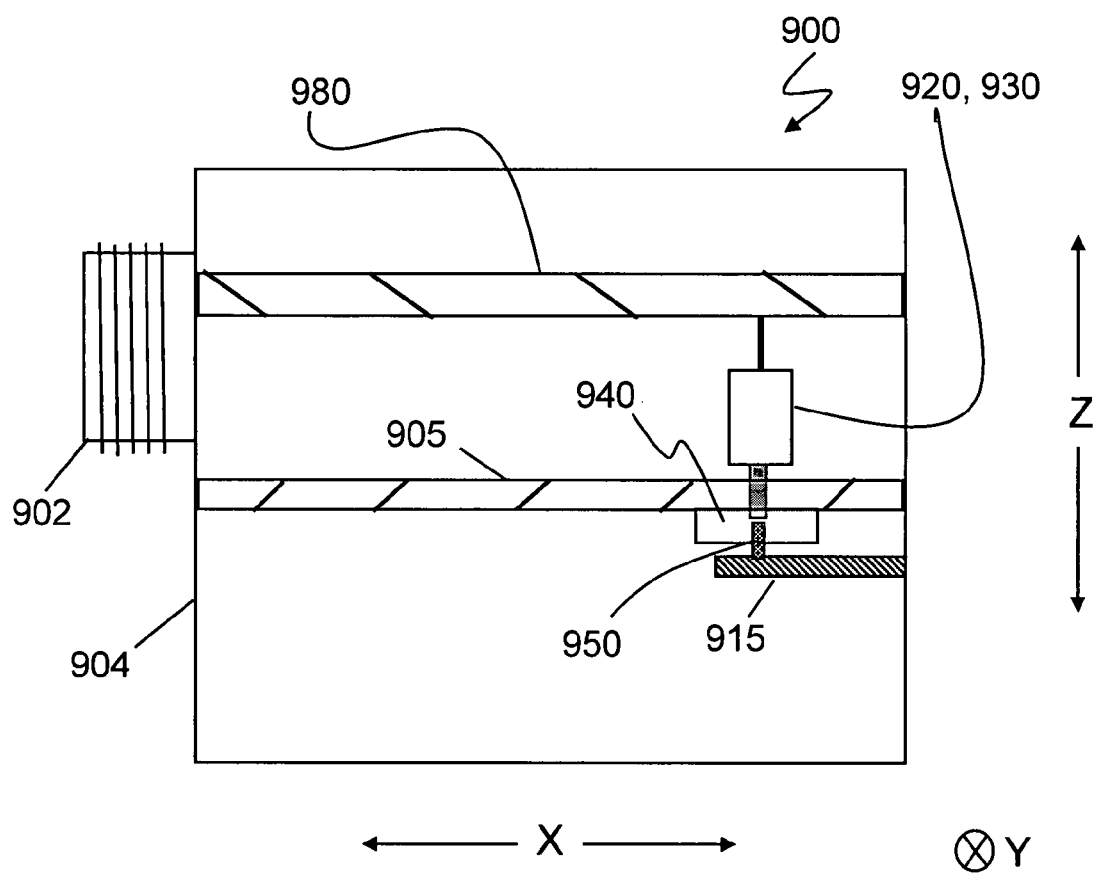
Figure 17:
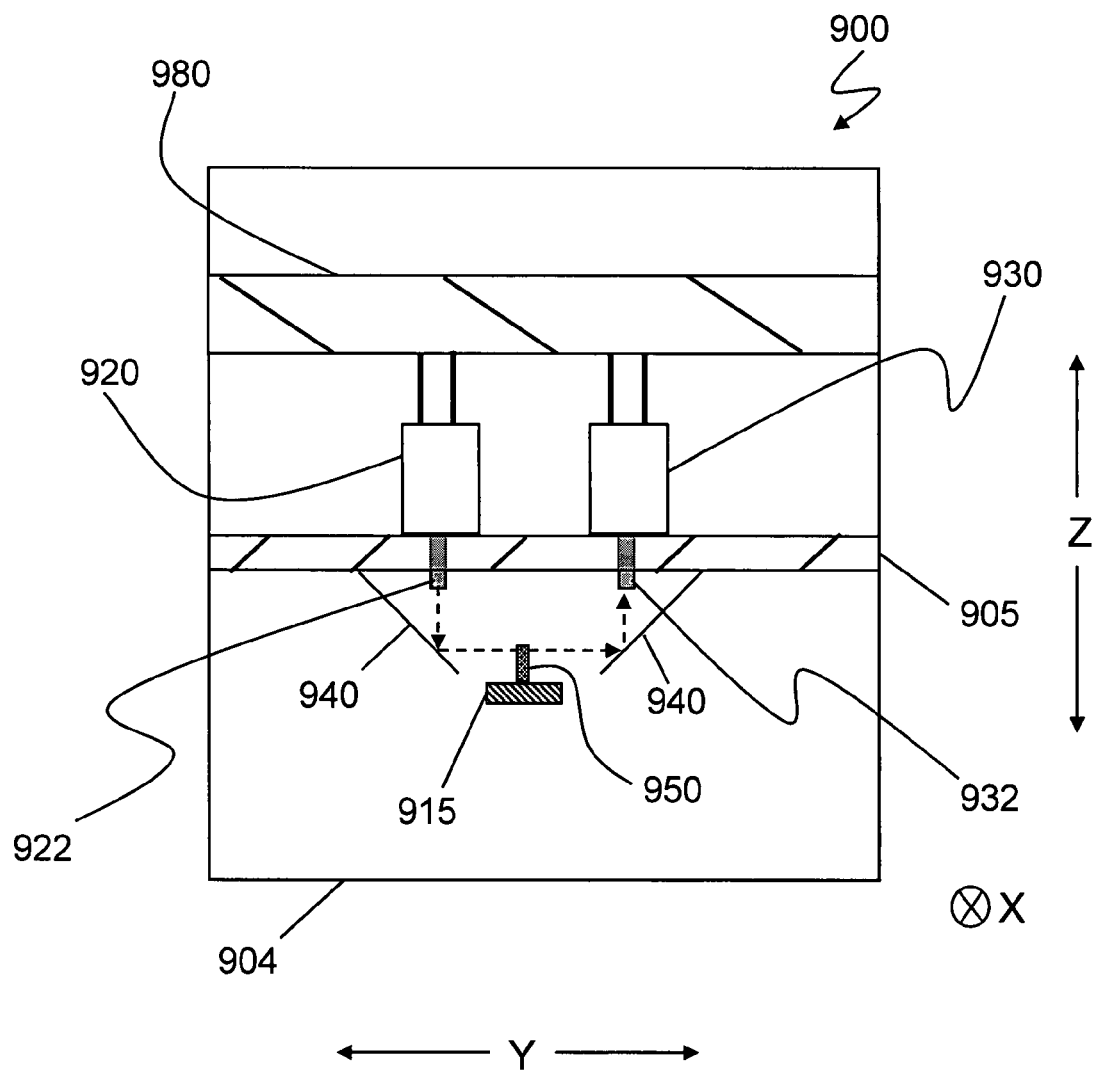

FIGS. 15, 16 and 17 are schematic views from different directions of an integrated, compact sensor 900 for measurement of temperature according to another embodiment of the system described herein. The compact sensor 900 may include a conveyor 920 and a receiver 930, like the conveyor 20 and receiver 30 discussed elsewhere herein, a temperature sensitive element 950, like the temperature sensitive element 50, discussed elsewhere herein, and an electronic device 980 for analyzing the received signals, like the electronic device 700 discussed elsewhere herein, among other components. As shown in the illustrated embodiment, the components referenced above may all be integrated into a single housing 904 of the sensor 900. The electronic device 980 may be incorporated on a printed circuit board inside the sensor 900 and insulated against electromagnetic radiation. Light from the conveyor 920 may be concentrated by a light concentrator 922 and/or light received by the receiver 930 may be concentrated by a light concentrator 932. The light conveyor 920 and the light receiver 930 may be contained entirely within the housing 904. It should be noted that the illustrated arrangement provides the advantage that optical fibers may not be required; however, optical fibers may be used for one or more of the light conveyor 920 and the light receiver 930 in connection the illustrated embodiment. Light from the conveyor 920 may impinge a mirror 940 and be reflected to the receiver 930, and a portion of the light occulted or otherwise interfered with by the temperature sensitive element 950 in response to temperature changes, as further discussed elsewhere herein. The electronic device 980 may analyze the resulting change in light intensity, as further discussed elsewhere herein.

The light conveyor 920, light concentrator 922, light receiver 930 and light concentrator 932 may be attached to the housing 904 or otherwise supported with a structural support 905. The temperature sensitive element 950 may be attached to the housing 904 or otherwise supported with a structural support 915. The sensor 900 is illustrated with a connection interface 902 for digitally connecting the sensor to a computer, computer network or other device that receives the output signal from the sensor 900 and that may include a display to display results. It should also be noted that one or more reference fibers may be incorporated into the illustrated embodiment, in which case at least a portion of the electronic circuitry of the electronic device 980 may be like the electronic device 800 discussed herein.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A temperature sensor, comprising:
   a light conveyor that emits light;
   a light receiver disposed to receive light emitted from the light conveyor;
   a temperature sensitive element having at least one dimension that is temperature sensitive and that is disposed so as to physically and partially obstruct a path of a light beam between the light conveyor and the light receiver, wherein the temperature sensitive element variably modifies an intensity of the light received by the light receiver, wherein the intensity of the light is variably modified by a change in the at least one dimension of the temperature sensitive element, and wherein the change in the at least one dimension varies according to a temperature change of the temperature sensitive element; and
   an electronic device coupled to the light conveyor and the light receiver that includes a driver that controls an intensity of the light emitted from the light conveyor based on a feedback loop and using a reference signal, and wherein the electronic device includes at least one luminous intensity analyzer that analyzes the changes in intensity of the light received by the light receiver and outputs at least one signal.

2. The temperature sensor according to claim 1, wherein the light conveyor and the light receiver are optical fibers.

3. The temperature sensor according to claim 1, wherein the light conveyor, the light receiver and the temperature sensitive element are made of materials that are electrically non-conductive.

4. The temperature sensor according to claim 1, wherein the at least one dimension of the temperature sensitive element varies substantially proportionally to the temperature change.

5. The temperature sensor according to claim 1, further comprising:
   a first detector coupled to the light receiver that measures an amount of the light received by the light receiver and determines the change in temperature of the temperature sensitive element based on a change in the amount of light caused by the change in the at least one dimension of the temperature sensitive element.

6. The temperature sensor according to claim 1, wherein the light receiver is a first light receiver and wherein the sensor further comprises:
   a second light receiver disposed alongside the first light receiver, wherein the second light receiver receives a non-modified amount of light from the light conveyor, as a reference light, and wherein the non-modified amount of light received by the second receiver is the same as an amount of light that would be received by the first light receiver if the temperature sensitive element did not exist.

7. The temperature sensor according to claim 6, further comprising:
   a second detector coupled to the second light receiver that is used to calibrate the sensor.

8. The temperature sensor according to claim 7, wherein the second detector allows calibration of the sensor resulting from a drift caused by at least one of: aging of the sensor, ambient temperature variations, and light conductivity change of the light conveyor or first light receiver.

9. The temperature sensor according to claim 1, wherein the light conveyor directly faces the light receiver, and wherein the path between the light conveyor and the light receiver is a gap between the light conveyor and the light receiver.

10. The temperature sensor according to claim 1, further comprising:
    a target disposed to reflect incident light received from the light conveyor to the light receiver.

11. The temperature sensor according to claim 10, wherein the target includes a two-face mirror having first and second faces disposed at an approximately 90 degree angle with respect to each other, the first face receiving from the light conveyer incident light at a first incident angle of approximately 45 degrees and reflecting the incident light onto the second face at a second incident angle of approximately 45 degrees, the second face reflecting the incident light received from the first face to the light receiver.

12. The temperature sensor according to claim 10, wherein the target includes at least one of: a curved mirror and a flat mirror, and wherein, in connection with the target as the flat mirror, the conveyor is angled with respect to the light receiver.

13. The temperature sensor according to claim 1, wherein the at least one dimension includes a length of the temperature sensitive element, and wherein the change in the at least one dimension includes a change in the length of the temperature sensitive element.

14. The temperature sensor according to claim 1, further comprising:
    a mirror that reflects incident light received from the light conveyor.

15. The temperature sensor according to claim 14, wherein the light receiver receives light reflected from the mirror.

16. The temperature sensor according to claim 1, further comprising:
    a reference optical fiber that receives a non-modified amount of light from the light conveyor, wherein the non-modified amount of light received by the reference optical fiber is substantially independent of the change in temperature of the temperature sensitive element.

17. The temperature sensor according to claim 16, further comprising:
    a mirror that reflects incident light received from the light conveyor.

18. The temperature sensor according to claim 17, wherein the light receiver receives light reflected from the mirror.

19. The temperature sensor according to claim 17, wherein the mirror includes a two-face mirror having first and second faces disposed at an approximately 90 degree angle with respect to each other, the first face receiving, from the light conveyer, incident light at a first incident angle of approximately 45 degrees and reflecting the incident light onto the second face at a second incident angle of approximately 45 degrees, the second face reflecting the incident light received from the first face to the light receiver.

20. The temperature sensor according to claim 17, wherein the mirror includes at least one of: a single flat mirror and a curved mirror.

21. The temperature sensor according to claim 1, wherein the temperature sensitive element is disposed in the path between the light conveyor and the light receiver and variably modifies an amount of light received by the light receiver by variably occulting at least a portion of the light emitted by the conveyor, wherein the portion of light variably occulted by the temperature sensitive element varies according to a temperature change of the temperature sensitive element.

22. A temperature sensor, comprising:
  a light conveyor that emits light;
  a light receiver disposed to receive light emitted from the light conveyor;
  a temperature sensitive element having at least one dimension that is temperature sensitive and that is disposed so as to interfere with a path of a light beam between the light conveyor and the light receiver, wherein the temperature sensitive element variably modifies an intensity of the light received by the light receiver, wherein the intensity of the light is variably modified by a change in the at least one dimension of the temperature sensitive element, and wherein the change in the at least one dimension varies according to a temperature change of the temperature sensitive element; and
  an electronic device coupled to the light conveyor and the light receiver that includes a driver that controls an intensity of the light emitted from the light conveyor based on a feedback loop and using a reference signal, and wherein the electronic device includes at least one luminous intensity analyzer that analyzes the changes in intensity of the light received by the light receiver and outputs at least one signal.

23. The temperature sensor according to claim 22, wherein the light conveyor and the light receiver are optical fibers.

24. The temperature sensor according to claim 22, wherein the light conveyor, the light receiver and the temperature sensitive element are made of materials that are electrically non-conductive.

25. The temperature sensor according to claim 22, wherein the at least one dimension of the temperature sensitive element varies substantially proportionally to the temperature change.

26. The temperature sensor according to claim 22, wherein the at least one dimension includes a length of the temperature sensitive element, and wherein the change in the at least one dimension includes a change in the length of the temperature sensitive element.

27. The temperature sensor according to claim 22, further comprising:
  a first detector coupled to the light receiver that measures an amount of the light received by the light receiver and determines the change in temperature of the temperature sensitive element based on a change in the amount of light caused by the change in the at least one dimension of the temperature sensitive element.

28. The temperature sensor according to claim 27, further comprising:
  a reference optical fiber that receives a non-modified amount of light from the light conveyor, wherein the non-modified amount of light received by the reference optical fiber is substantially independent of the change in temperature of the temperature sensitive element; and
  a second detector coupled to the reference optical fiber that is used to calibrate the sensor.

29. The temperature sensor according to claim 22, wherein the light conveyor directly faces the light receiver, and wherein the path between the light conveyor and the light receiver is a gap between the light conveyor and the light receiver.

30. The temperature sensor according to claim 22, further comprising:
  a target disposed to reflect incident light received from the light conveyor to the light receiver.

31. The temperature sensor according to claim 30, wherein the target includes at least one of the following: (i) a two-face mirror having first and second faces disposed at an approximately 90 degree angle with respect to each other, the first face receiving from the light conveyer incident light at a first incident angle of approximately 45 degrees and reflecting the incident light onto the second face at a second incident angle of approximately 45 degrees, the second face reflecting the incident light received from the first face to the light receiver; (ii) a curved mirror;
  or (iii) a flat mirror, wherein, in connection with the target as the flat mirror, the conveyor is angled with respect to the light receiver.

* * * * *